United States Patent [19]

Lake

[11] Patent Number: 5,523,546

[45] Date of Patent: Jun. 4, 1996

[54] APPARATUS AND METHOD OF INDUCTIVELY HEATING A WORKPIECE WITH A SLENDER BONE

[75] Inventor: Robert Lake, Morris Plains, N.J.

[73] Assignee: Mannings, U.S.A., Inc., Morristown, N.J.

[21] Appl. No.: 437,312

[22] Filed: May 9, 1995

[51] Int. Cl.⁶ ........................................ H05B 6/38
[52] U.S. Cl. ................ 219/644; 219/670; 219/677; 219/673
[58] Field of Search ........................ 219/644, 635, 219/637, 643, 677, 672, 660, 673

[56] References Cited

U.S. PATENT DOCUMENTS

| | | | |
|---|---|---|---|
| 2,176,601 | 10/1939 | Bates | 219/50 |
| 2,397,629 | 4/1946 | Stevens | 219/644 |
| 2,418,675 | 4/1947 | Strickland, Jr. | 219/644 |
| 2,810,053 | 10/1957 | Messner | 219/644 |
| 3,492,453 | 1/1970 | Hurst | 219/644 |
| 4,590,347 | 5/1986 | Thatcher et al. | 219/644 |
| 5,397,876 | 3/1995 | Shimamoto et al. | 219/644 |

Primary Examiner—Philip H. Leung
Attorney, Agent, or Firm—Thomas L. Adams

[57] ABSTRACT

An inductive device can heat a body having a slender bore, with an inductor assembly that includes a coolant system. The assembly has a parallel pair of elongate inductors sized to fit deep inside the bore. Each of these inductors has a distal end and a proximal end. The distal ends of the inductors can be electrically interconnected. These inductors are adapted at their proximal ends to connect to a source of current for circulating current along the inductors. The coolant system is adapted to communicate with a source of coolant to circulate coolant along the inductors. The inductors are inserted through the bore of the body to lie lengthwise, without coiling, along the length of the bore. Coolant can then be pumped along the elongate inductors. Then by driving alternating current to flow through the inductors, magnetic coupling to the body occurs to produce heating effects.

32 Claims, 3 Drawing Sheets

APPARATUS AND METHOD OF INDUCTIVELY HEATING A WORKPIECE WITH A SLENDER BONE

BACKGROUND OF THE INVENTION

1. Field of the Invention

The present invention relates to inductive heaters, and in particular, to heaters working inside the bore of a workpiece.

2. Description of Related Art

Known inductive heaters typically have a large open coil for encircling a workpiece. These coils are designed to conduct very high currents and to magnetically stimulate the workpiece. The magnetically stimulated workpiece will be heated by hysteresis losses and the flow of large eddy currents.

To sustain the high currents needed for inductive heating, the primary inductive coil is typically rather large and requires an active cooling system. For example, known inductive coils have been hollow tubes through which a liquid coolant is circulated. The coolant can be provided from a refrigerant unit that keeps the coolant at a relatively low temperature.

Known inductive heaters have employed a parallel pair of inductors that conduct current in opposite directions. For example, in U.S. Pat. No. 4,788,396 a hairpin-shaped inductor can embrace a thin metal sheet covered with a metal powder that is to be sintered. This device works with relatively modest currents since the workpiece is less than 1 mm thick. Thus this reference does not have a coolant system. Furthermore, this reference is only concerned with an external inductor.

As a further example, in U.S. Pat. Nos. 3,699,302 and 3,836,743, bolts pass between a pair of parallel inductors to be inductively heated thereby. The latter two references are again concerned with external inductive heaters.

When cavities or bores are inductively heated, conventional apparatus have used a multi-turn coil. See for example U.S. Pat. No. 4,849,594. Because of the high currents and the multiple turns, these structures tend to be relatively bulky and are useful only for heating from inside a relatively large cavity. See also U.S. Pat. No. 4,625,090 revealing a relatively large and complicated current loop wound coaxially in the cylinder of a tripot.

U.S. Pat. No. 5,182,427 shows a parallel pair of inductors that are mounted inside a tube for conducting a loop of current. The inductors are mounted inside a number of spaced ferrite beads. The ferrite beads are designed to be heated by the magnetic fields of the parallel inductors. While this design does rely on the magnetic coupling to the ferrite beads, the heating of the surrounding body is not through inductive heating. Instead, the heating is the typical conductive, convective or radiant heating associated with prior art heaters. Also, this reference is unconcerned with high power applications where a coolant system is needed.

Inductive heating has been used in connection with the installation or removal of various fasteners. See U.S. Pat. Nos. 3,771,209 and 5,025,128.

See also U.S. Pat. Nos. 4,056,750; 4,695,712; 4,973,811; 5,066,755; 5,291,063; and 5,374,809.

In certain applications fasteners must be heated as part of the installation or removal procedure. For example, bolts used in industrial steam turbines are rather large steel devices that must be heated to lengthen the bolt. After cooling the bolt will contract and produce a high axial force for holding the turbine casing together. To facilitate this heating, these turbine bolts are made with an axial bore to hold a temporary heater element. Conventionally, a resistive heater wire has been inserted in the bore of the bolt. A disadvantage with this type of heater is the relatively long thermal delays needed to convey heat from the heater wire to the turbine bolt by conductive, convective and radiant processes. Because conventional inductive heaters are in the form of a helical coil, they have been unable to fit inside the relative slender bore of a turbine bolt.

Accordingly, there is a need for an inductive heater capable of efficiently heating a body having a slender bore.

SUMMARY OF THE INVENTION

In accordance with the illustrative embodiments demonstrating features and advantages of the present invention, there is provided an inductive device for heating a body having a slender bore. The inductive device includes an inductive means having a parallel pair of elongate inductors sized to fit deep inside the bore. Each of the inductors has a distal end and a proximal end. The distal ends of the inductors have means for electrically interconnecting the inductors. The inductors are adapted at their proximal ends to connect to a source of current for circulating current along the inductors. The inductive means includes cooling means adapted to communicate with a source of coolant to circulate coolant along the inductors.

In accordance with another aspect of the present invention, a method is provided for heating a body having a slender bore, with a parallel pair of elongate inductors that are electrically interconnected at their distal ends. The method includes the step of inserting the inductors through the bore of the body to lie lengthwise, without coiling, along the length of the bore. Another step is pumping coolant along the elongate inductors. The method also includes the step of driving alternating current to flow inwardly through one of the inductors and outwardly through the other, to couple magnetically to the body and induce a heating effect.

By employing apparatus and methods of the foregoing type, bodies having slender bores can be heated efficiently and effectively. Also, the foregoing is highly effective in heating turbine bolts which may have a slender blind bore. The preferred inductor is in the form of a pair of tubes that are mounted in parallel inside the bore. The distal ends of the tubular inductors are connected together to provide a continuity of electrical and hydraulic flow. Thus one can connect a current source to the parallel inductors at their proximal ends to cause a current circulation along the length of both parallel tubular inductors. Also, being connected hydraulically, a refrigerated coolant can circulate inside the tubular inductors to prevent overheating and damage to the inductors.

In a preferred embodiment, a plurality of magnetic core elements are mounted between the parallel inductors. For example, a number of stacks of steel laminations can be mounted between the tubular inductors. These magnetic cores focus the magnetic flux and increase the coupling between the inductors and the body to be heated.

In alternate embodiments, the tubular inductors can be inserted as a quartet of tubes having a pie shaped periphery. The distal ends of the four tubular inductors are connected in two distinct pairs. In this arrangement the current direction is reversed when comparing inductors that are adjacent to one another in a circumferential direction. In this embodiment, a cruciform core element can be placed in a space between the four inductors. Again the core element can be a stack of laminations.

In still other embodiments, the inductors may be solid wires that are mounted within the inside wall of a double walled conduit. The double walled construction provides two flow paths separated by the inner wall of the double walled structure, which allows refrigerated coolant to circulate past the inductors.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention, when taken in conjunction with the accompanying drawings, wherein.

DETAILED DESCRIPTION OF THE PREFERRED EMBODIMENTS

Figure 1:
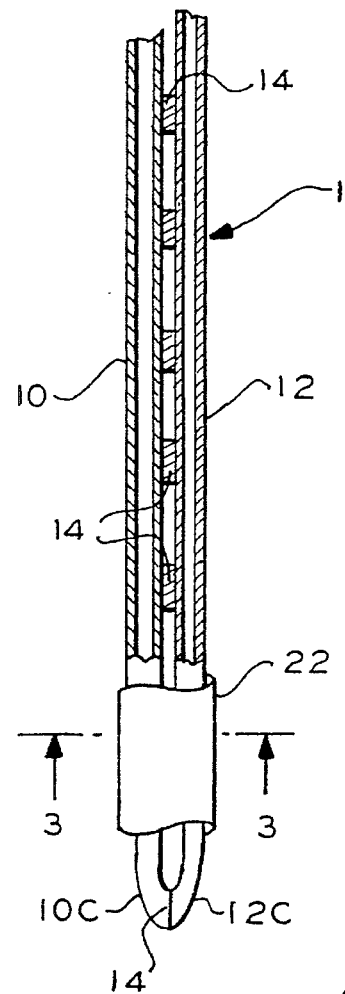
FIG. 1 is a side view of an inductive means in accordance with the principles of the present invention, and illustrated in the form of a pair of tubular inductors shown partially in axial cross-section for illustrative purposes.
Figure 2:
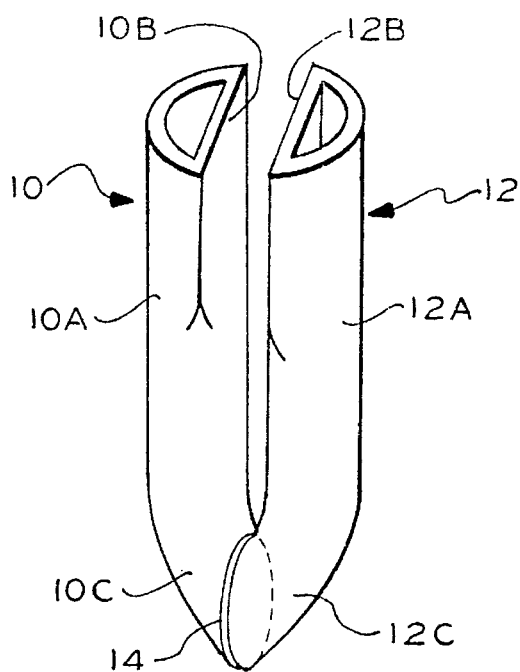
FIG. 2 is a detailed view of the distal end of the tubular inductors of FIG. 1.

Referring to FIGS. 1 and 2, a portion of an inductive means 15 is illustrated as a pair of copper refrigeration tubes 10 and 12. Tubes 10 and 12 may be formed with a D-shaped periphery, by shaping a conventional round copper tube with rollers, dies, a press or manually with a hammer. Alternatively, the copper tubing can be formed initially by extruding molten copper.

Tubes 10 and 12 are shown with rounded faces 10A and 12A, respectively. These rounded faces 10A and 12A have a semi-cylindrical exterior. Rounded faces 10A and 12A are bordered by inside flat faces 10B and 12B, respectively. Elongated tubular inductors 10 and 12 have their distal ends 10C and 12C, respectively, connected together. In particular, the distal ends 10C and 12C are not formed with a D-shaped periphery, but have a circular cross-section, instead. Also, ends 10C and 12C are bent obliquely to merge at an acute angle. Essentially, the walls of tubular inductors 10 and 12 are welded together along seam 14. Seam 14 is designed to provide electrical continuity and a liquid tight joint between tubular inductors 10 and 12. Alternatively, the tubes 10 and 12 can be formed from a single tube, which is carefully bent at a mid-point without kinking or occluding the tubular inductor.

A plurality of magnetic core elements 14 are shown distributed longitudinally between the tubular inductors 10 and 12. Core elements 14 have a thickness matching the space between tubes 10 and 12, for example, ¼ inch (0.64 cm). In the distal section of the inductive means where core elements reside, the core elements 14 may occupy 50% of the length along tubes 10 and 12, although in other embodiments the density may be less or may be closer to 100%, depending upon the desired magnetic coupling. In some embodiments, the length of core elements 14 is 1 inch, although the length may vary depending upon the expected bend radius, the desired degree of coupling, etc. The transverse width of core elements 14 matches the overall width of tubes 10 and 12; specifically core elements 14 have the same width as flat faces 10B and 12B.

The assembly of FIG. 1 will be covered in a jacket 22. Although shown exposed in this view, the joined ends 10C and 12C of tubes 10 and 12 will be covered by the jacket as well.

Figure 3:
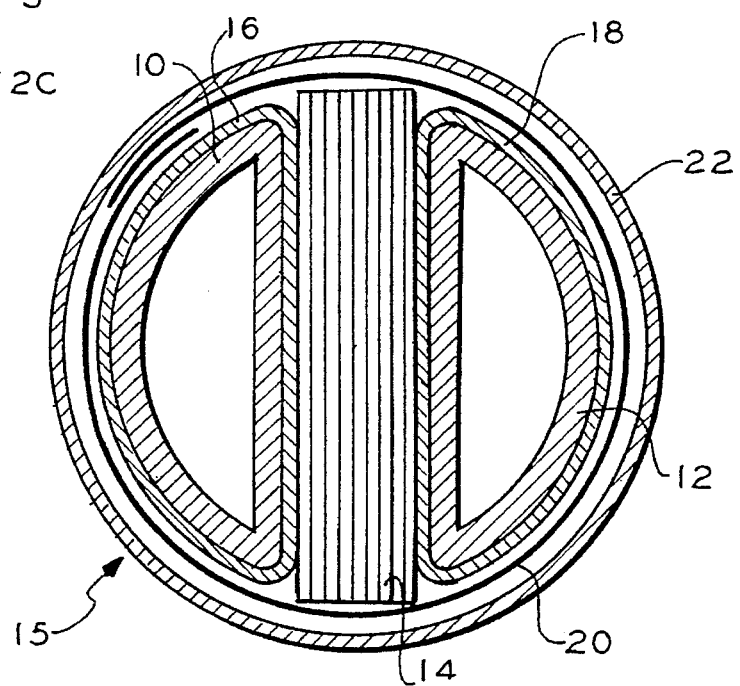
FIG. 3 is a cross-sectional view taken along line 3—3 of FIG. 1.

Referring to FIG. 3, core element 14 is shown as a plurality of laminations made of silicon steel, about 0.004 inch (0.10 mm) thick. Accordingly, about 60 laminations can be stacked in core element 14. The laminations of core element 14 extend longitudinally here, but in other embodiments the laminations may be stacked to extend transversely.

Tubular inductors 10 and 12 are shown covered by a pair of sleeves 16 and 18. Sleeves 16 and 18 may be high temperature glass (fiberglass) sleeves designed to act as an electrical insulator and withstand the high temperatures produced in the tubular inductors. Next, the tubular inductors 10 and 12 and the magnetic core 14 are spirally wrapped by a glass adhesive tape 20 to keep the components together and aligned. Finally, the assembly is mounted inside a tubular jacket 22 in the form of a glass sleeve similar to sleeves 16 and 18.

Figure 4:
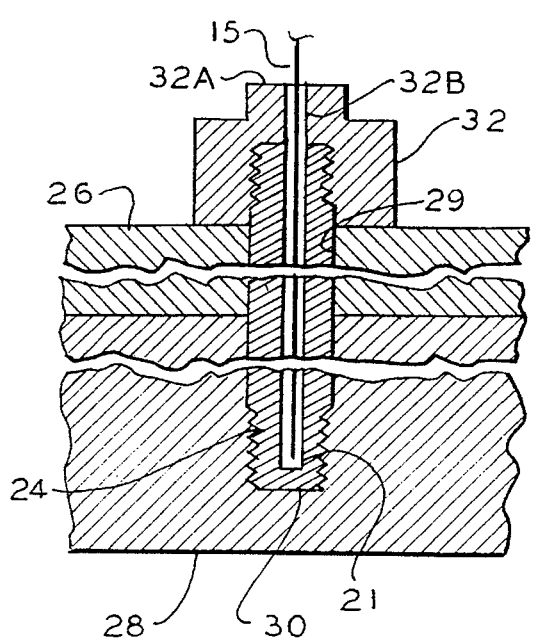
FIG. 4 is a cross-sectional view of the inductive means of FIG. 1 mounted in a body having a slender bore, in accordance with the principles of the present invention.

Referring to FIG. 4, previously illustrated inductive means 15 is shown mounted in the slender bore 22 of body 24. Body 24 is in this embodiment a turbine bolt that is used to hold together the casing elements 26 and 28 of an industrial steam turbine. In some embodiments, turbine bolt 24 may be 60 inches (152 cm) long and 4 or 5 inches (10 or 13 cm) in diameter, although other dimensions are anticipated. Turbine bolt 24 is shown passing through bolt hole 29 in turbine casing 26 and threaded into the bottom of the blind bolt hole 30 in the lower turbine casing 28. The upper end of turbine bolt 24 is fitted with a nut 32 having an annular boss 32A. Nut 32 has a center bore 32B that is aligned with the slender bore 21 in turbine bolt 24.

Figure 5:
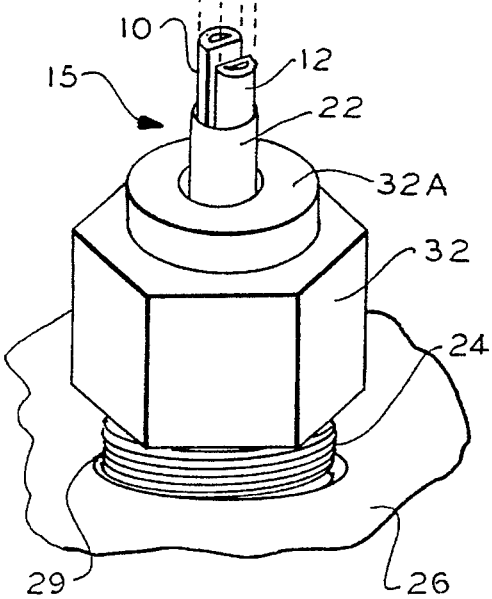
FIG. 5 is a detailed, axonometric view of the upper portion of the assembly of FIG. 4 and showing the proximal end of the tubular inductors.

Referring to FIG. 5, turbine bolt 24 is shown mounted in hole 29 of upper turbine casing 26. Nut 32 is shown partially threaded over turbine bolt 24. The inductive means 15 is shown emerging from the central opening of boss 32A of nut 32. The proximal ends of tubular inductors 10 and 12 cease having a D-shaped cross-section at their extreme outer ends 34 and 36. Ends 34 and 36 are connected to male fittings 38 and 40 for connection to a water cooled coaxial cable (not shown). An example of such a cable is the model TH cable manufactured by LC Miller Company of Monterey Park, Calif.

Figure 6:
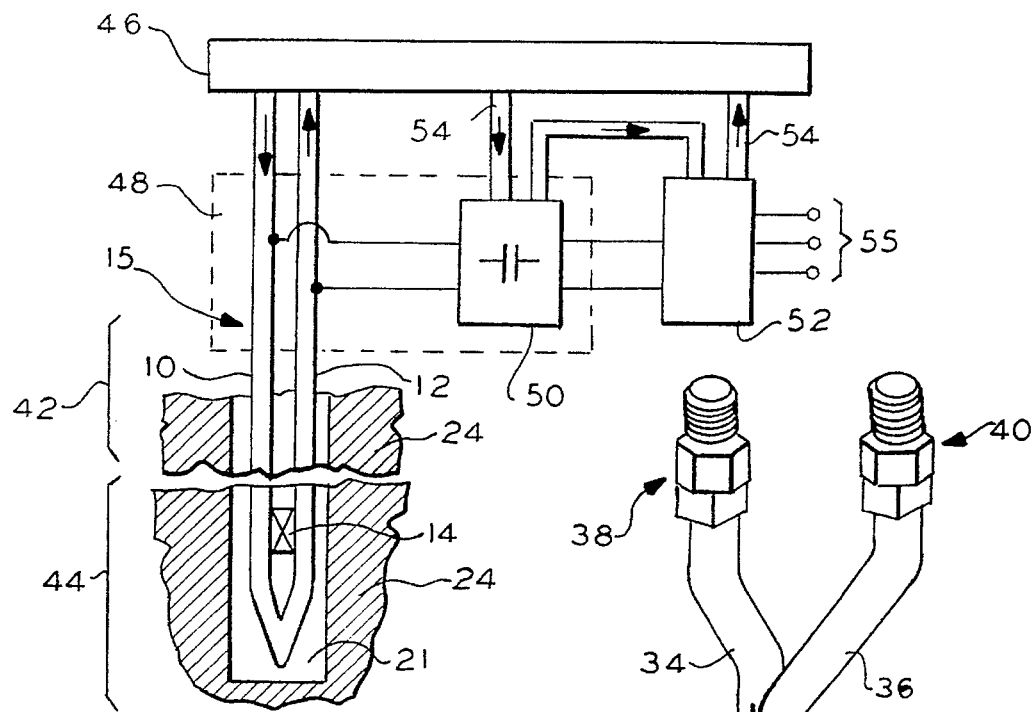
FIG. 6 is a schematic view of an electrical source and a source of refrigerated coolant, connected to the inductive means of FIG. 1.

Referring to FIG. 6, previously illustrated tubular inductors 10 and 12 are shown emerging from slender bore 21 of partially illustrated turbine bolt 24. The ends of tubular inductors 10 and 12 emerging from bolt body 24 are herein referred to as the proximal ends of the proximal section 42. The distal section 44 of tubular inductors 10 and 12 have, as mentioned before, a plurality of magnetic core elements 14. The proximal section 42 of tubular inductors 10 and 12 lack, however, magnetic core elements. This feature means that the magnetic flux in proximal section 42 is not strongly focused and coupled to body 24 at its opening. This feature is useful since it avoids heating any nut that is mounted at the exposed end of bolt body 24. Such heating can impede nut tightening or removal. The domain of proximal section 42 will be chosen depending upon the need to keep heat away from any nut on the bolt body 24.

Tubular inductors 10 and 12 are shown connected to a source of coolant 46 through a water cooled coaxial cable (not shown) and through a heat station 48. Since refrigerant unit 46 can pump a coolant through tubular inductors 10 and 12, the interior of tubular inductors 10 and 12 are herein referred to as a coolant means. A source of current is shown herein as an inverter 52 connected through variable impedance 50 to the tubular inductors 10 and 12.

The two outside ends of inductors 10 and 12 are connected to heat station 48 through a coaxial cable using the conventional pressure fittings. For that purpose, the ends of tube 10 will be flared after attaching a threaded fitting, in a conventional manner.

Electrical current is supplied by an inverter 52 powered by power main 55. Inverter 52 produces an alternating current at a variable frequency. Inverter 52 is designed in a conventional fashion to seek a resonant frequency based on the series inductance and capacitance loading the inverter 52.

The impedance effectively loading inverter 52 is adjusted by an impedance adjusting circuit 50. In typical embodiments of such a circuit, the inverter output is coupled to a transformer (not shown) whose secondary can be connected in series with various switchable capacitors. Thus, the series capacitance of circuit 50 when taken together with the inductance of inductors 10 and 12, form a tank circuit with which inverter 52 resonates. The resonant frequency of inverter 52 is typically 3 to 10 kHz.

Because of the large currents required, (for example, currents up to 2,000 Amps), there are significant power losses in the supply circuitry, which generates much internal heat. Resistive or hysteresis losses in heat station 48 and inverter 52 have a tendency to overheat the system and causing damage.

For this reason refrigerating unit 46 is provided with the usual components: a first cycle employing a compressor, expansion valve, condenser and evaporator. This first cycle is used to cool a coolant such as water that is pumped to circulate in a second cycle. Unit 46 is shown having a pair of lines 54, which independently provide coolant to the illustrated systems. Lines 54 are connected to the series combination of inverter 52 and impedance adjusting stage 50. Also coolant circulates through inductors 10 and 12 to cool them when inside bolt body 24.

Figure 7:
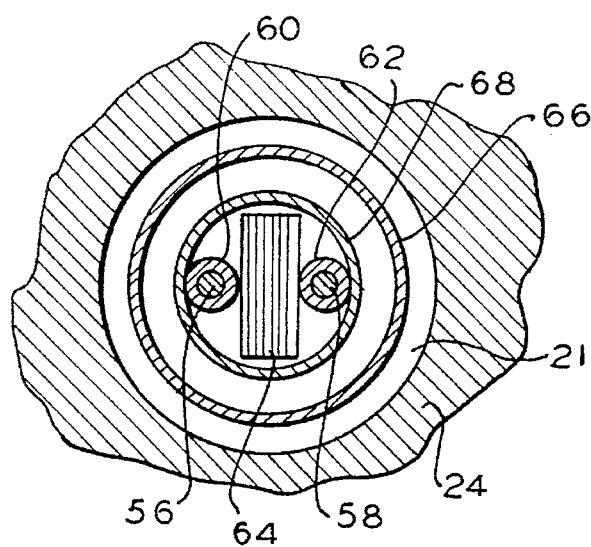
FIG. 7 is a cross-sectional view of a pair of parallel inductors that are an alternate to the inductive means of FIG. 1 and which are also mounted in the slender bore of a body.

Referring to FIG. 7, an alternative inductive means is shown herein as a parallel pair of solid copper inductors 56 and 58. Inductors 56 and 58 are sheathed with high temperature glass sleeves 60 and 62, respectively. Sleeved inductors 56 and 58 are mounted on opposite sides of a magnetic core element 64, which may be arranged in manner similar to that previously described (i.e., elements 14 of FIG. 1).

Here a coolant means is shown as a double walled conduit having an outer wall 66 and an inner wall 68. Coolant may be pumped to flow in one direction between walls 66 and 68 and flow in the opposite direction inside inner conduit 68, thereby cooling inductors 56 and 58. The entire assembly is shown again mounted in a slender bore 21 of a body such as a turbine bolt 24.

Figure 8:
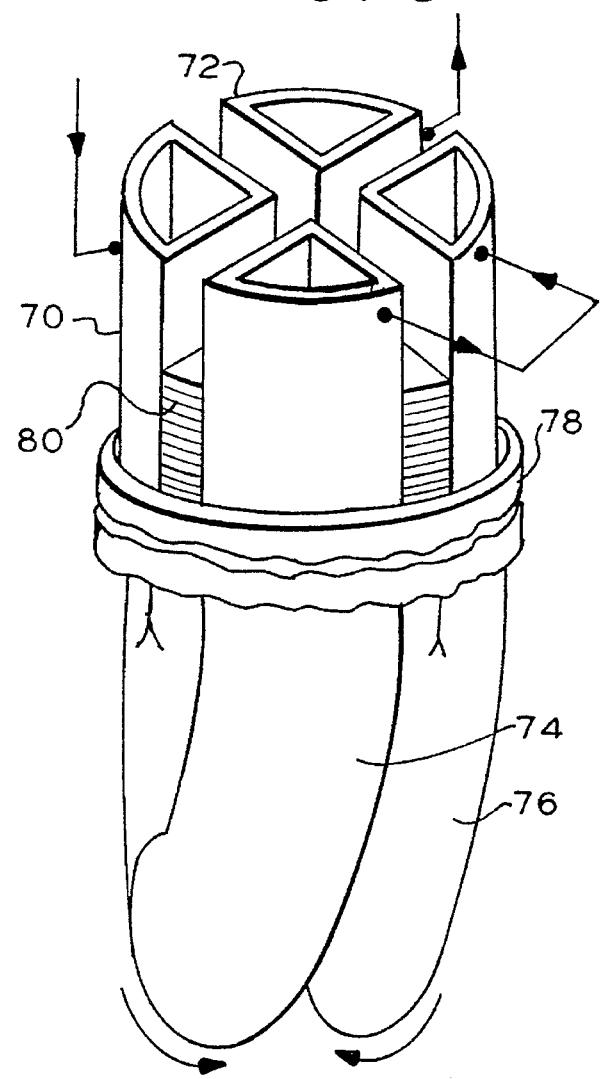
FIG. 8 is an axonometric view (portions broken away for clarity of illustration) of an inductive means that is an alternate to that of FIG. 1.

Referring to FIG. 8, an alternate inductive means is shown having four parallel inductors. Tubular elongate inductors 70 and 72 are adapted to be connected to a source of coolant and a source of current in a manner similar to that shown in connection with FIG. 6. Elongate tubular inductors 70 and 72, however, each have one outer rounded face and two flat inner faces to form a pie-shaped periphery. As before, this shape may be obtained by extrusion, roller forming, by dies, presses, hammering, etc.

The distal ends of elongate inductors 70 and 72 do not connect to each other but are shown connected to the distal ends of a parallel pair of elongate conductive elements 74 and 76, respectively, which have a similar shape and also act as inductors. As before, this connection provides electrical continuity and forms a liquid-tight joint so that the elements can communicate. As before, the lower ends illustrated in FIG. 8 are referred to as distal ends, and the upper ends as proximal ends. Tubular elements 70–76 are shown distributed equiangularly along the inside circumference of a tubular jacket 78, which may be another high temperature glass sleeve. Elements 70–76 are essentially mounted parallel to a central, common longitudinal axis.

The proximal ends of elements 74 and 76 are connected together (connection shown only schematically). Preferably, these proximal ends will emerge from the body being heated and will have at that position a cylindrical exterior. Thereafter, the ends of the tubes can be butt welded or can be connected together by appropriate fittings to allow liquid and current to pass between these elements.

Figure 9:
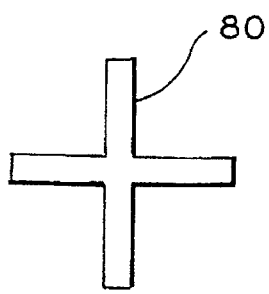
FIG. 9 is a plan view of one of the laminations acting as a magnetic core element in FIG. 8.

A gap exists between elements 70–76, which is occupied by a cruciform magnetic core 80. Magnetic core element 80 is formed from a stack of silicon steel laminations having the outline illustrated in FIG. 9. The elements 70–76 are connected to conduct current in the directions illustrated. Thus elements that are circumferentially adjacent will conduct current in an opposite direction.

To facilitate an understanding of the principles associated with the foregoing apparatus, its operation will be briefly described. The inverter 52, and variable impedance 50 are connected to the inductor 10 and 12 shown in FIG. 6. The nut 32 (FIG. 4) has already been tightened so much that normal wrenches or other tools cannot now be used to remove the nut without risk of damaging the fastening system.

Accordingly, heat is generated by inductive means 15 which causes bolt 24 to thermally expand and lengthen. This relieves the pressure between nut 32 and the outer surface of casing 26.

To heat bolt 24, the inverter 52 is energized while the refrigerant unit 46 provides coolant. The various capacitors in impedance matching unit 50 are switched to provide an appropriate resonant frequency for inverter 52. Typically the resonant frequency will be set somewhere in the range of 5 to 30 kHz. This frequency is chosen to provide the desired magnetic coupling and penetration of the electromagnetic energy. At the resonant frequency, the magnetic flux established in bolt 24 causes a high frequency magnetic flux to appear in the bolt. This causes eddy currents whose resistive losses cause heat. In addition, the steel bolt 16 acts like a magnetic core and experiences a reversal of magnetic polarization at the power frequency. The rapid reversal of the magnetic field causes a hysteresis loss, which also generates heat within bolt 24. Normally the inductive means will heat the turbine bolt for about 3 to 10 minutes, although the heating time will depend upon the power rating, mass of the bolt and other thermal factors. A typical power input for the inductive means is in the range of 100 kW.

Once bolt 24 has been adequately heated, the nut 32 can be loosened. Once the nut 32 is removed, turbine bolt 24 is allowed to cool. This reduces the tightness of the fit of bolt 24 in the turbine casings 26 and 28. Thus if necessary, turbine bolt 16 can be removed.

Referring to FIG. 6, the currents flowing through tubular inductors 10 and 12 generate a flux that tends to encircle each of the inductors. Consequently, magnetic flux tends to be concentrated in the magnetic core elements 14. This reduces the air gap through which the magnetic flux must pass, thereby enhancing the magnetic coupling from the tubular inductors 10 and 12 to the bolt body 24.

Significantly, magnetic core elements 14 are located in the distal section 44 of the tubular inductors 10 and 12. Because the magnetic core elements 14 are absent in proximal section 42, there is less magnetic coupling there. Therefore nut 32 (shown in FIG. 4) will have less of a tendency to heat. This produces two beneficial effects: (a) less power is drained by nut 32 and its associated hardware; (b) the nut 32 is unheated and therefore does not tend to expand and press against the outside surface of turbine casing 26.

When installing a turbine bolt, the process is essentially reversed. Cold bolts are fitted into the turbine casing components 26 and 28. Bolt 24 can be threaded into the threaded end 30 of the bolt hole in case 28 in a conventional fashion. Nut 32 is threaded onto bolt 24 and partially tightened. Thereafter, inductive means 15 (FIG. 4) is inserted through the bore 32B and threaded through to the bottom of the slender blind bore 21.

Thereafter, inductive means 15 heats the turbine bolt 24 in the manner just described. As a result bolt 24 lengthens due to thermal expansion. At this time, nut 32 is fully tightened. After power is removed from inductive means 15, bolt 24 cools and thermally contracts. This tightens the bolt further and increases the pressure between the casing components 26 and 28.

It is to be appreciated that various modifications may be implemented with respect to the above described preferred embodiments. While D-shaped and pie-shaped tubular inductors are illustrated, in other embodiments the periphery can be circular, polygonal, oval, or have other shapes. Also, the magnetic core elements can in some instances be continuous strips that run the entire length of the inductor, at least along the section where strong magnetic coupling is desired. In other embodiments, the magnetic core may be formed of strips that are butted end to end with the abutment occurring at staggered positions. While copper tubing is illustrated, in other embodiments various other types of metals and other materials may be employed instead. Furthermore, the sheaths and jackets used to insulate and hold together the inductive means can be made of various plastics, ceramics and other materials that can tolerate relatively high temperatures. Also in some embodiments, the inductive means can be encapsulated with a flexible potting, epoxy, or other material to bind the assembly together. Moreover, the size, the magnitude of the current, the frequency setting and other electrical parameters can be varied depending upon the particular application. Likewise, the type of coolant as well as its temperature and flow rate can be adjusted depending upon the thermal characteristics. Also, the various dimensions discussed herein can be altered depending upon the specific environment. Also the coolant can in some cases be tap water or non-cycling water from another source.

Obviously, many modifications and variations of the present invention are possible in light of the above teachings. It is therefore to be understood that within the scope of the appended claims, the invention may be practiced otherwise than as specifically described.

I claim:

1. An inductive device for heating a body having a slender bore, comprising:

inductive means having a parallel pair of elongate inductors sized to fit deep inside said bore, each of said inductors having a distal end and a proximal end, the distal ends of said inductors having means for electrically interconnecting said inductors, said inductors being adapted at their proximal ends to connect to a source of current for circulating current along said inductors;

a magnetic core mounted between said parallel pair of inductors and segmented to restrict current; and insulating means encompassing each of said inductors and separating them from said magnetic core and said body, said inductive means including:

cooling means adapted to communicate with a source of coolant to circulate coolant along said inductors.

2. An inductive device according to claim 1 wherein said inductors are tubular and are electrically and hydraulically interconnected at their distal ends, said inductors being adapted at their proximal ends to communicate with said source of current and said source of coolant to circulate current and coolant.

3. An inductive device according to claim 2 wherein said inductors are transversely spaced.

4. An inductive device according to claim 2 wherein said inductors have an outer rounded face adjoining a flat face.

5. An inductive device according to claim 4 wherein each of said inductors has, in cross-section, a D-shaped periphery.

6. An inductive device according to claim 4 wherein each of said inductors has, in cross-section, a pie shaped periphery.

7. An inductive device according to claim 1 wherein said magnetic core comprises:

a longitudinally spaced plurality of magnetic core elements mounted between said parallel pair of inductors.

8. An inductive device according to claim 7 wherein said inductors are tubular and are electrically and hydraulically interconnected at their distal ends, said inductors being adapted at their proximal ends to communicate with said source of current and said source of coolant to circulate current and coolant.

9. An inductive device according to claim 8 wherein said core elements each comprise a plurality of stacked laminations.

10. An inductive device according to claim 9 wherein each of said laminations extend longitudinally.

11. An inductive device according to claim 9 wherein each of said laminations extend transversely.

12. An inductive device according to claim 1 wherein said insulating means comprises:

a tubular jacket surrounding a predetermined length along said inductors, said magnetic core including:

a longitudinally distributed plurality of magnetic core elements mounted between said parallel pair of inductors.

13. An inductive device according to claim 12 wherein said predetermined length along said inductors includes (a) a distal section occupied with a distribution of said magnetic core elements, and (b) a proximal section lacking said magnetic core elements, so that magnetic coupling and heating from said proximal section is less in proximal portions of said bore.

14. An inductive device according to claim 12 wherein said insulating means comprises:

a pair of sheaths mounted around said pair of inductors.

15. An inductive device according to claim 1 wherein said inductive means has a parallel pair of elongate conductive elements sized to fit inside said bore to a depth similar to that of said elongate inductors, each of said conductive elements having an distal end and a proximal end, the distal ends of said conductive elements being separately connected to corresponding ones of said inductors, said conductive elements being connected together at their proximal ends to conduct current between said elongate inductors.

16. An inductive device according to claim 15 wherein said pair of conductive elements are interleaved with said inductors, equiangularly about a common longitudinal axis.

17. An inductive device according to claim 15 wherein said pair of conductive elements and said pair of inductors are distributed equiangularly about a common longitudinal axis, and are connected to support four equiangularly distributed, parallel current paths with oppositely poled currents in circumferentially adjacent ones of said paths.

18. An inductive device according to claim 17 wherein said magnetic core comprises:

a cruciform magnetic core element mounted among said parallel pair of inductors.

19. An inductive device according to claim 17 wherein said magnetic core comprises:

a longitudinally spaced plurality of cruciform magnetic core elements mounted among said parallel pair of inductors.

20. An inductive device according to claim 15 wherein said pair of conductive elements and said pair of inductors are tubular and interconnected to support a flow of coolant.

21. An inductive device according to claim 1 wherein said cooling means comprises:

a conduit containing said elongate inductors and supporting a flow of coolant along said inductors.

22. An inductive device according to claim 21 wherein said magnetic core comprises:

a longitudinally spaced plurality of magnetic core elements mounted between said parallel pair of inductors.

23. An inductive device according to claim 1 wherein said cooling means comprises:

a double walled conduit containing said elongate inductors, said conduit having coolant flowing between the double walls in a direction opposite to that flowing inside an inner one of the double walls.

24. A method of heating a body having a slender bore, with a segmented magnetic core located between a parallel pair of elongate inductors that are electrically interconnected at their distal ends, comprising the steps of:

spacing and insulating said parallel pair of elongate inductors from said segmented magnetic core and from said body;

inserting said inductors with said segmented magnetic core through said bore of said body to lie lengthwise, without coiling, along the length of said bore;

sending coolant along said elongate inductors; and driving alternating current to flow inwardly through one of said inductors and outwardly through the other, to couple magnetically to said body and induce a heating effect.

25. A method according to claim 24 wherein said magnetic core comprises a plurality of magnetic core elements, the method including the step of:

longitudinally distributing said magnetic core elements between said parallel inductors before insertion into said bore.

26. A method according to claim 25 wherein a predetermined length of said parallel inductors are inserted into said bore with (a) a distal section of said inductors occupied with a distribution of said magnetic core elements, and (b) a proximal section of said inductors lacking said magnetic core elements, so that magnetic coupling and heating from said proximal section is less in proximal portions of said bore.

27. A method according to claim 24 wherein said body is a bolt, said method including the step of:

loosening said bolt after heating it with said heating effect.

28. A method according to claim 24 wherein said body is a bolt, said method including the step of:

tightening said bolt after heating it with said heating effect.

29. A method according to claim 24 wherein said alternating current alternates at a frequency of between 5 to 30 kHz.

30. A method according to claim 24 wherein said body is a turbine bolt, said method including the step of:

loosening said bolt after heating it with said heating effect.

31. A method according to claim 24 wherein said body is a turbine bolt, said method including the step of:

tightening said bolt after heating it with said heating effect.

32. A method according to claim 24 wherein the step of inserting the inductor is performed by positioning said inductor in said bore coaxially.

* * * * *